(12) United States Patent
Butlin, Jr. et al.

(10) Patent No.: US 8,100,460 B2
(45) Date of Patent: Jan. 24, 2012

(54) EXTENDABLE AIR CONTROL DAM FOR VEHICLE

(75) Inventors: Albert H. Butlin, Jr., Beverly Hills, MI (US); Lisa M. Simms, Lake Orion, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 148 days.

(21) Appl. No.: 12/395,732

(22) Filed: Mar. 2, 2009

(65) Prior Publication Data

US 2010/0219661 A1  Sep. 2, 2010

(51) Int. Cl.
  *B60J 9/00* (2006.01)
(52) U.S. Cl. .................................... 296/180.1
(58) Field of Classification Search ............... 296/180.1, 296/180.2, 180.3, 217, 180.5, 1.01
  See application file for complete search history.

(56) References Cited

U.S. PATENT DOCUMENTS

| | | | | |
|---|---|---|---|---|
| 1,352,679 A | * | 9/1920 | Myers | 296/180.1 |
| 1,526,439 A | * | 2/1925 | Shipp | 236/38 |
| 1,961,526 A | * | 6/1934 | Otto | 236/38 |
| 2,234,470 A | * | 3/1941 | Burns | 137/115.15 |
| 2,234,685 A | * | 3/1941 | Vance | 312/271 |
| 3,212,769 A | * | 10/1965 | Kanichiro et al. | 267/64.23 |
| 3,273,876 A | * | 9/1966 | Hannan | 267/186 |
| 3,609,990 A | * | 10/1971 | Bottum | 62/217 |
| 3,618,998 A | * | 11/1971 | Swauger | 296/180.5 |
| 3,743,180 A | * | 7/1973 | Perkins et al. | 236/1 C |
| 3,782,122 A | * | 1/1974 | Lorenz | 60/531 |
| 3,804,364 A | * | 4/1974 | De Lepeleire | 251/43 |
| 3,845,783 A | * | 11/1974 | De Lepeleire | 137/504 |
| 3,853,143 A | * | 12/1974 | De Lepeleire | 137/494 |
| RE29,302 E | * | 7/1977 | De Lepeleire | 251/43 |
| 4,131,308 A | * | 12/1978 | Holka et al. | 296/180.5 |
| 4,159,140 A | * | 6/1979 | Chabot et al. | 296/180.5 |
| 4,314,774 A | * | 2/1982 | Tsuji et al. | 405/115 |
| 4,379,582 A | * | 4/1983 | Miwa | 296/180.5 |
| 4,460,213 A | * | 7/1984 | Janssen et al. | 296/180.5 |
| 4,527,580 A | * | 7/1985 | Chheda | 137/1 |
| 4,558,897 A | * | 12/1985 | Okuyama et al. | 296/180.5 |
| 4,585,262 A | * | 4/1986 | Parks | 296/180.1 |
| 4,659,130 A | * | 4/1987 | Dimora et al. | 296/180.1 |
| 4,683,974 A | * | 8/1987 | Richardson | 180/274 |
| 4,758,037 A | * | 7/1988 | Suzuki et al. | 296/180.1 |
| 4,770,457 A | * | 9/1988 | Tomforde | 296/180.5 |
| 4,778,212 A | * | 10/1988 | Tomforde | 296/180.1 |
| 4,810,022 A | * | 3/1989 | Takagi et al. | 296/180.5 |
| 4,951,994 A | * | 8/1990 | Miwa | 296/180.1 |
| 4,976,489 A | * | 12/1990 | Lovelace | 296/180.1 |
| 5,238,022 A | * | 8/1993 | Zink | 137/554 |
| 5,259,425 A | * | 11/1993 | Johnson et al. | 141/12 |
| 5,280,990 A | * | 1/1994 | Rinard | 296/180.1 |
| 5,313,190 A | * | 5/1994 | Clayton et al. | 340/436 |

(Continued)

*Primary Examiner* — Kiran B. Patel

(57) ABSTRACT

An air dam is attached to the underside of a vehicle and extends downwardly into proximity with the road surface and potential interference with curbs or like obstructions extending above the road surface. A panel assembly includes a top wall attached to the underside of the motor vehicle, forward and rearward walls depending from the top wall, and a bottom wall. These walls cooperate to define an interior space, and the forward and rearward walls have serially arranged pleats connected by living hinges by which the panel assembly can adjusted in height by flexing the living hinges to provide an extended position of the panel assembly in which the bottom wall is positioned further below the underside of the motor vehicle and a withdrawn position in which the bottom wall is withdrawn upwardly closer to the underside of the motor vehicle to avoid potential interference with curb or like obstructions.

18 Claims, 4 Drawing Sheets

U.S. PATENT DOCUMENTS

| | | | |
|---|---|---|---|
| D348,705 S * | 7/1994 | Onopa | D12/181 |
| 5,332,021 A * | 7/1994 | Todd et al. | 160/133 |
| 5,692,796 A * | 12/1997 | Yamamoto et al. | 296/180.1 |
| 6,209,947 B1 * | 4/2001 | Rundels et al. | 296/180.1 |
| 6,412,476 B1 * | 7/2002 | Thompson et al. | 123/516 |
| 6,422,542 B2 * | 7/2002 | Gramss | 267/64.24 |
| 6,450,304 B1 * | 9/2002 | Miller et al. | 188/266.5 |
| 6,886,883 B2 * | 5/2005 | Jacquemard et al. | 296/180.5 |
| 6,954,068 B1 * | 10/2005 | Takamori et al. | 324/318 |
| 7,040,690 B2 * | 5/2006 | Soja et al. | 296/180.5 |
| 7,661,753 B2 * | 2/2010 | Shinedling et al. | 296/180.5 |
| 7,740,303 B2 * | 6/2010 | Wood | 296/180.4 |
| 7,775,582 B2 * | 8/2010 | Browne et al. | 296/180.1 |
| 7,784,854 B2 * | 8/2010 | Breidenbach | 296/180.1 |
| 2010/0237549 A1 * | 9/2010 | Jeischik | 267/122 |

* cited by examiner

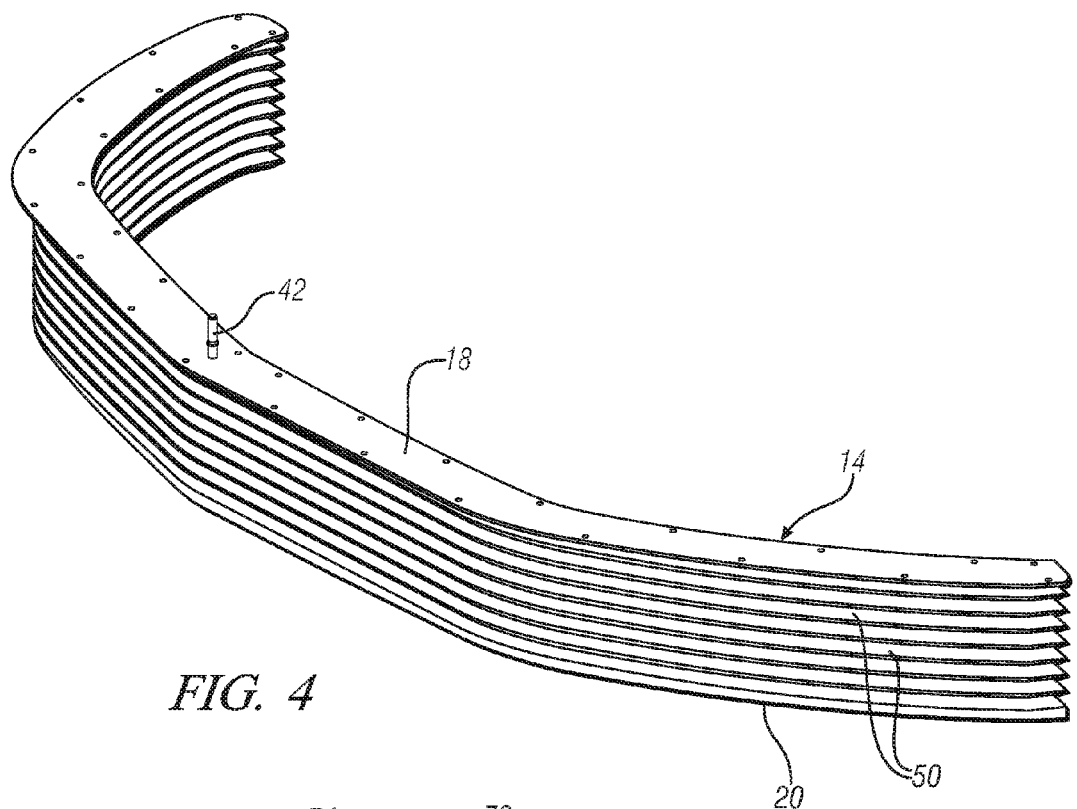
FIG. 4
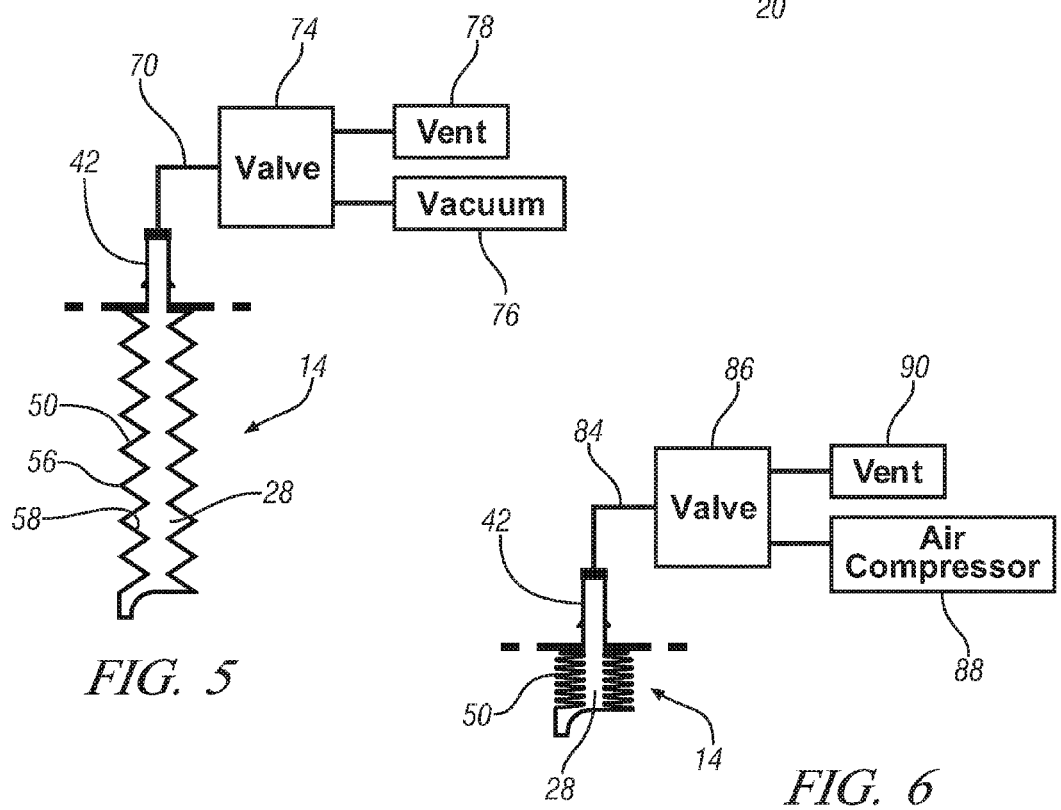
FIG. 5
FIG. 6

EXTENDABLE AIR CONTROL DAM FOR VEHICLE

FIELD OF THE INVENTION

The present invention relates to an air dam for a motor vehicle and more particularly provides a blow molded plastic air dam assembly extending downwardly from the underside of the vehicle and having pleated walls by which the air dam can move between an extended position closer to the road and a withdrawn position stored beneath the underside of the motor vehicle.

BACKGROUND OF THE INVENTION

It is known that the aerodynamic characteristics of motor vehicles can be improved by an air dam mounted underneath the front bumper of the car and extending into proximity with the roadway.

A disadvantage of such an air dam is that its extending downward into proximity with the road surface creates a potential interference with curbs or like obstructions extending above the normal road surface.

In the prior art, various proposals have been made for movable air dams, and hinge and linkage mechanisms have been provided in the mounting of an air dam to enable movement of the air dam between extended and withdrawn positions. In addition, the prior art has taught that the movement of the air dam may be provided by mechanical or hydraulic actuators.

It would be desirable to provide an improved air dam assembly of simplified construction and operation and lower cost.

SUMMARY OF THE INVENTION

An air dam is attached to the underside of a vehicle and extends downwardly into proximity with the road surface and potential interference with curbs or like obstructions extending above the road surface. A panel assembly includes a top wall attached to the underside of the motor vehicle, forward and rearward walls depending from the top wall, and a bottom wall. These walls cooperate to define an interior space, and the forward and rearward walls have serially arranged pleats connected by living hinges by which the panel assembly can adjusted in height by flexing the living hinges to provide an extended position of the panel assembly in which the bottom wall is positioned further below the underside of the motor vehicle and a withdrawn position in which the bottom wall is withdrawn upwardly closer to the underside of the motor vehicle to avoid potential interference with curb or like obstructions.

BRIEF DESCRIPTION OF THE DRAWINGS

The present invention will become more fully understood from the detailed description and the accompanying drawings wherein:

FIG. 4 is a perspective view of the air dam panel assembly of this invention.

FIGS. 5, 6, and 7 are schematic presentations of various control mechanisms for moving the air dam panel assembly between the extended position of FIGS. 1 and 2 and the withdrawn position of FIG. 3.

DETAILED DESCRIPTION OF THE EXEMPLARY EMBODIMENTS

The following description of certain exemplary embodiments is exemplary in nature and not intended to limit the invention, its application, or uses.

Figure 1:
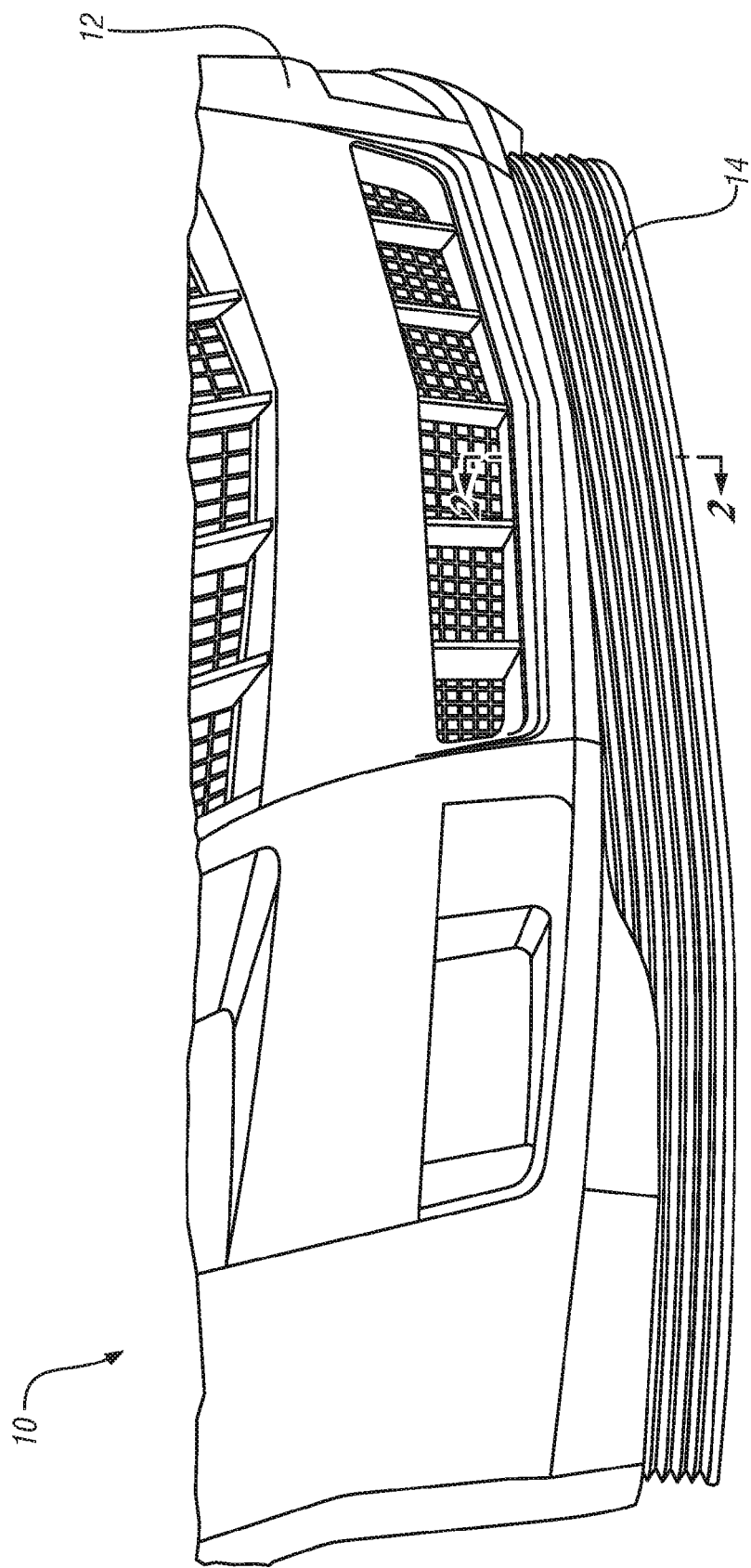
FIG. 1 is a perspective view of the front of a motor vehicle showing the air dam panel assembly in its extended position.

Referring to FIG. 1, it is seen that a motor vehicle generally indicated at 10 has a molded plastic front fascia 12 that conceals a front bumper bar and other structure of the vehicle body, not shown. An panel assembly 14 is attached to the underside of the motor vehicle 10 and is shown in FIG. 1 at an extended position in which the panel assembly 14 will partially close out the space between the under side of the vehicle and the road surface in order to improve the aerodynamic characteristics of the motor vehicle.

Figure 2:
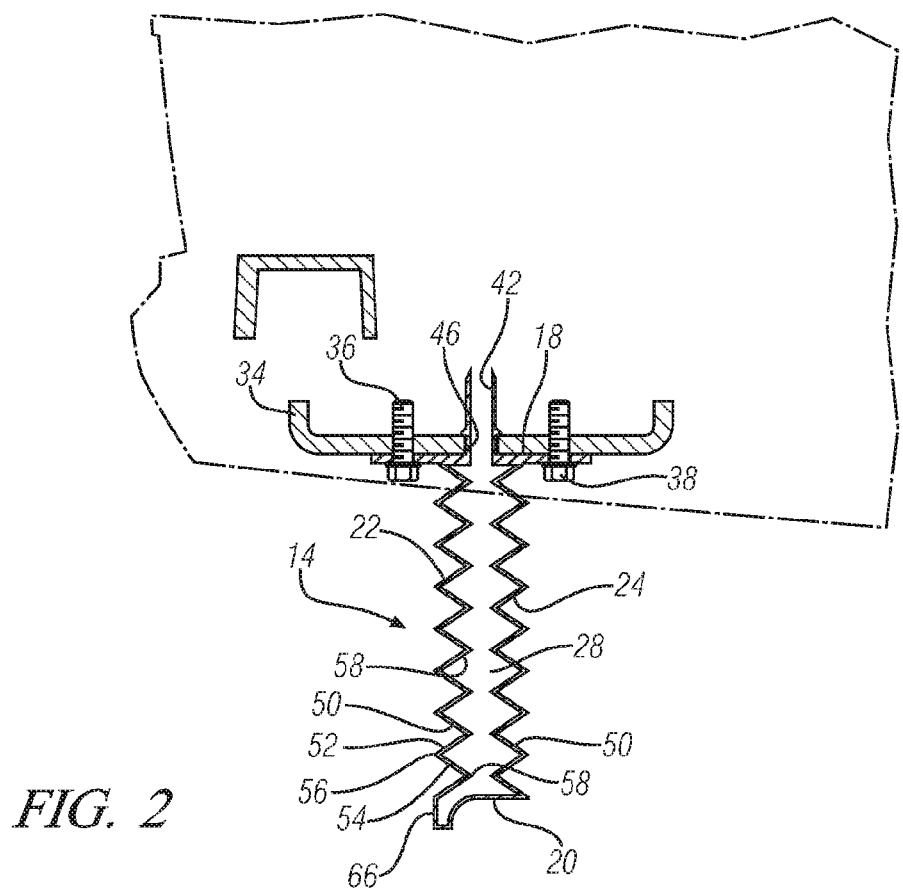
FIG. 2 is a section view taken through the air dam panel assembly in the direction of arrows 2-2 of FIG. 1.

Referring now to FIGS. 2 and 4, it will be seen that the panel assembly 14 is a one-piece blow molded plastic panel assembly that includes generally a top wall 18, a bottom wall 20, a forward wall 22, and a rearward wall 24. These walls cooperate to define a interior space 28, the walls having thicknesses that provide the generally self supporting shape of FIG. 2, as opposed to being of a thinner material that would not be self supporting of the shape disclosed herein. The interior space 28 defined by the walls is hollow, sealed, and has a hollow stem 42.

As best seen in FIGS. 2 and 4, the top wall 18 is generally planar and is suitably attached to the underside of a suitable vehicle body structure 34 by fasteners 36 and 38. The hollow stem 42 is molded integrally with the top wall 18 and extends upwardly through an aperture 46 provided in the structure 34.

Referring to FIG. 2, the forward wall 22 and the rearward wall 24 are each formed of a plurality of serially arranged horizontal extending pleats 50. A typical pleat 50 includes an upper pleat portion 52 and a lower pleat portion 54 that are joined together by an outer living hinge 56. Each of these pleats 50 is in turn connected to the adjacent pleat 50 by inner living hinges 58. Thus, the forward wall 22 and the rearward wall 24 consist of alternating pleat portions 52 and 54 that are connected by living hinges 56 and 58 that are arranged in accordion fashion by which the forward wall 22 and rearward wall 24 can be folded and unfolded via flexure of the living hinges 56 and 58. These living hinges and pleats are formed in the blow-molding process of forming the panel assembly 14.

As also seen in FIG. 2, the bottom wall 20 of the panel assembly 14 spaces apart the forward wall 22 and the rearward wall 24. A front lower lip structure 66 extends downwardly from the forward wall 22 and the bottom wall 20 to stiffen the lower edge of the panel assembly 14 and define the aerodynamic air flow.

As best seen in FIG. 4, the overall shape of the panel assembly 14 is curved or arcuate when seen from above so that the panel assembly 14 will generally match the curvature of the front of the motor vehicle. More importantly, this curved shape of the panel assembly 14 causes the pleats 50 to also follow the curved path and, in so doing, the curvature of the pleat portions 52 and 54 and living hinges 56 and 58 will cooperate to generally stiffen the forward wall 22 and the rearward wall 24 against movement that might be induced by the on rushing air stream as the motor vehicle is traveling at high speeds. Furthermore, the pleated shape of the forward wall 22 and rearward wall 24 will cooperate to maintain a reliable distance between the forward wall 22 and rearward wall 24, thereby giving the panel assembly 14 a predetermined shape against flexure in the fore and aft direction.

Figure 3:
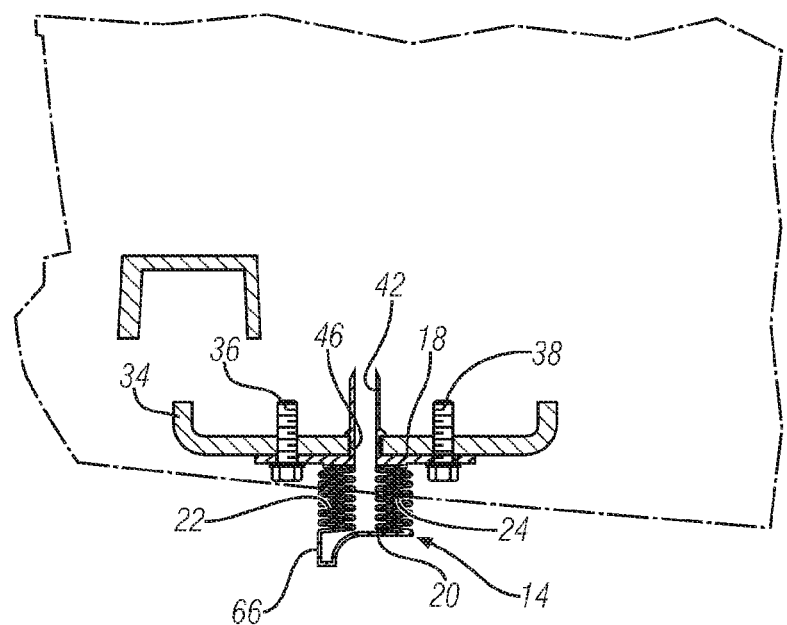
FIG. 3 is a section view taken through the air dam panel assembly but showing the air dam in its withdrawn position stored beneath the front of the motor vehicle.

Referring now to FIG. 3, the panel assembly 14 is shown in a withdrawn position in which the bottom wall 20 has been retracted upwardly into closer proximity with the top wall 18 as permitted by the flexure of the living hinges 56 and 58 and the folding up of the pleat portions 52 and 54. Thus, in FIG. 3 the panel assembly 14 has been withdrawn to a stored position which is substantially away from possible interference with curbs or similar obstructions.

It will be understood that the panel assembly 14 can be blow molded in either the extended position of FIG. 2 or the withdrawn position of FIG. 3. For example, if the panel assembly 14 is molded in the extended position of FIG. 2, the living hinges 56 and 58 will constantly urge the panel assembly 14 to its extended position and the panel assembly 14 can only be retracted by exerting sufficient force on the panel assembly 14 to overcome the natural and inherent spring effect of the living hinges 56 and 58. On the other hand, if the panel assembly 14 is molded in the withdrawn position of FIG. 4, the living hinges 56 and 58 will inherently urge the panel assembly 14 to the withdrawn position and it will be necessary to exert sufficient force to extend the panel assembly 14 to its extended position of FIG. 2.

Figure 7:
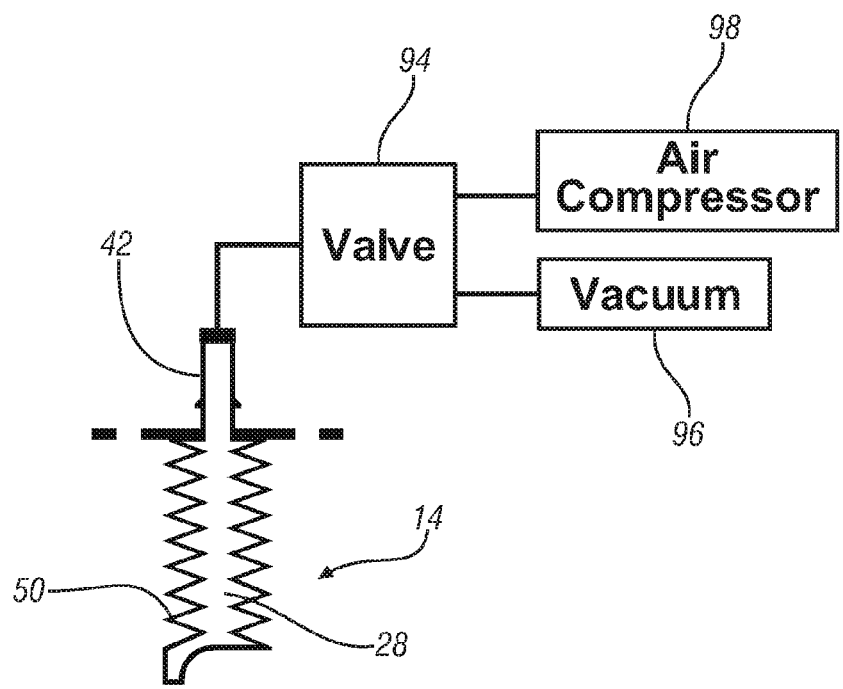

FIGS. 5, 6, and 7 show different examples of control mechanisms for moving the panel assembly 14 between the extended position and the withdrawn position. In FIG. 5, the panel assembly 14 is molded in its extended position and a vacuum pump 76 is employed to evacuate air from the interior space 28 to thereby collapse the panel assembly 14 to its withdrawn position. In particular, a pipe 70 is connected to the stem 42 of the panel assembly 14 and is also connected to a valve 74. The valve 74 is operated to connect the vacuum pump 76 to the panel assembly 14 when it is desired to retract the panel assembly 14. Then, when it is desired to extend the panel assembly 14, the valve 74 is operated to connect the panel assembly 14 to vent 78, thereby communicating atmospheric pressure to the interior space 28 so that the panel assembly 14 can return to its normal extended position via the energy stored in the living hinges 56 and 58.

FIG. 6 shows the example of an panel assembly 14 that is molded in its collapsed position so that the inherent spring effect of the living hinges 56 and 58 establish the pleat portions 52 and 54 in their folded condition. A pipe 84 connects the stem 42 to a valve 86. When the panel assembly 14 is to be extended, the valve 86 connects with an air compressor 88 so that compressed air is communicated through the stem 42 into the interior space 28 to extend the panel assembly 14 by overcoming the biasing effect of the living hinges 56 and 58. Then, when it is intended to again withdraw the panel assembly 14 the valve 86 will be cycled and compressed air is released through a vent 90.

Referring to FIG. 7, stem 42 of panel assembly 14 is connected to a valve 94 that is connected to both a vacuum pump 96 and an air compressor 98. The valve 94 can be cycled to connect either the vacuum pump 96 or the air compressor 98 to the panel assembly 14. Accordingly, the panel assembly 14 can be molded in any desired position and by communicating either the vacuum or the compressed air to the panel assembly, the panel assembly 14 can be extended or withdrawn as desired. For example, with the control mechanism of FIG. 7 the panel assembly 14 can be molded in a condition which could be midway between the extended position and the retracted position. In addition, the control arrangement of FIG. 7 may be desirable if it is known that the aging of the plastic material of the panel assembly 14 causes a weakening of the memory of the living hinges 56 and 58.

Figure 8:
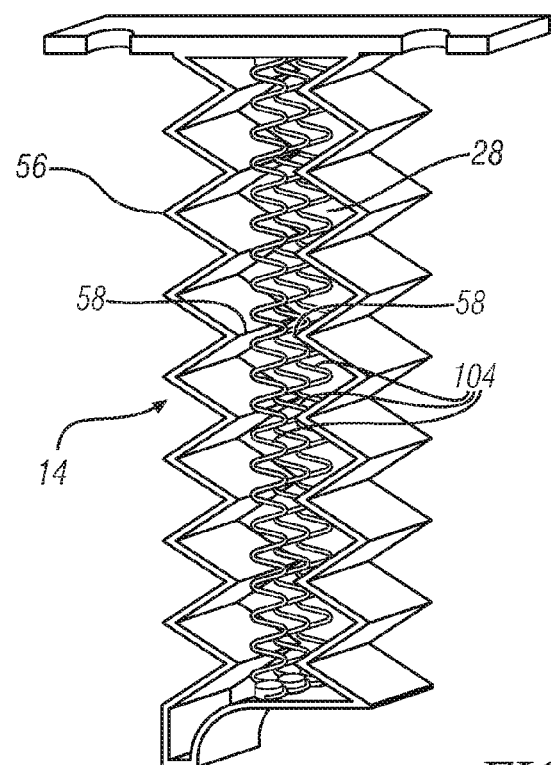
FIG. 8 is a section view taken through another embodiment of the invention wherein smart metal alloy wires will raise the panel assembly to its withdrawn position.

Referring to FIG. 8, a section is shown through another panel assembly 14. In the embodiment of FIG. 8, the panel assembly 14 is molded in the extended condition. A network of smart metal alloy (SMA) wires 104 is provided within the interior space 28 of the panel assembly 14 and this network of SMA wires acts between the adjacent inner living hinges 58. It is characteristic of smart alloy wire that upon the conduction of electrical current to the SMA wire, the wire will abruptly shorten in length. Thus, by having the SMA wire connected to adjacent living hinges 58, the shortening of the SMA wire by the electrical current will withdraw the panel assembly 14 to the retracted position by overcoming the energy that is stored in the living hinges 56 and 58.

The description of the invention is merely exemplary in nature and, thus, variations thereof are intended to be within the scope of the invention.

What is claimed is:

1. An air dam for attachment to an underside of a motor vehicle comprising:
a panel assembly including a top wall attached to the underside of the motor vehicle, forward and rearward walls depending from the top wall, and a bottom wall, said walls cooperating to define an interior space, and said forward and rearward walls each having a plurality of serially arranged pleats connected by living hinges by which the panel assembly can be varied in height by flexing the living hinges to provide an extended position of the panel assembly in which the bottom wall is positioned further below the underside of the motor vehicle and a withdrawn position in which the bottom wall is withdrawn upwardly closer to the underside of the motor vehicle.

2. The air dam of claim 1 further comprising the interior space is sealed, and supplying or withdrawing air from the interior space to move the panel assembly between the extended and withdrawn positions.

3. The air dam of claim 1 further comprising the panel assembly is of one-piece blow molded plastic construction.

4. The air dam of claim 1 further comprising the panel assembly having a shape that is curved.

5. The air dam of claim 1 further comprising the interior space is sealed and the panel assembly having an air inlet stem communicating with the sealed interior air space and connected to an air handling device such as a vacuum pump or an air compressor.

6. The air dam of claim 1 further comprising the interior space is sealed and said panel assembly is molded to have a normally extended position so that living hinges urge the panel assembly to the extended position and air is evacuated from the sealed interior space to withdraw the panel assembly to the withdrawn position.

7. The air dam of claim 1 further comprising said interior space is sealed and the panel assembly is molded to have a normally withdrawn position so that living hinges urge the panel assembly to the withdrawn position and air pressure is supplied to the sealed interior space to extend the panel assembly to the extended position.

8. The air dam of claim 1 further comprising the interior space is sealed and the panel assembly is molded to have a normal position that is intermediate the extended position and the withdrawn position so that the living hinges urge the panel assembly to the intermediate position and then air is selectively evacuated from the sealed interior space to withdraw the panel assembly to the withdrawn position or selectively supplying air to the sealed interior space to extend the panel assembly.

9. The air dam of claim 1 further comprising the interior space is sealed and the sealed interior space of the panel assembly is connected to a valve that selects between a source of compressed air and a source of vacuum to respectively move the air dam assembly to the extended position or to the withdrawn position.

10. The air dam of claim 1 further comprising a network of smart metal alloy wires provided within the panel assembly and connected to the serially arranged pleats so that conducting electricity to the smart metal alloy wires will shorten the wires and move the panel assembly to the withdrawn position.

11. An air dam for attachment to an underside of a motor vehicle comprising:
a panel assembly of one-piece blow molded construction including a top wall attached to the underside of the motor vehicle, forward and rearward walls depending from the top wall, and a bottom wall, said walls cooperating to define a sealed interior space, and said forward and rearward walls each having a plurality of serially arranged pleats connected by living hinges by which the panel assembly can be varied in height by flexing the living hinges to provide an extended position of the panel assembly in which the bottom wall is positioned further below the underside of the motor vehicle and a withdrawn position in which the bottom wall is withdrawn upwardly closer to the underside of the motor vehicle; and supplying or withdrawing air from the sealed interior air space to move the plastic panel assembly between the extended and withdrawn positions.

12. The air dam of claim 11 further comprising the panel assembly having a shape that is curved sufficiently in the plan view so that the curvature of the pleats will rigidify the air dam sufficiently to prevent oncoming air from bending the panel assembly during high speed vehicle operation.

13. The air dam of claim 11 further comprising the interior space is sealed and said panel assembly is molded to have a normally extended position so that living hinges urge the panel assembly to the extended position and air is evacuated from the sealed interior space to withdraw the panel assembly to the withdrawn position.

14. The air dam of claim 11 further comprising said interior space is sealed and the panel assembly is molded to have a normally withdrawn position so that living hinges urge the panel assembly to the withdrawn position and air pressure is supplied to the sealed interior space to extend the panel assembly to the extended position.

15. The air dam of claim 11 further comprising the interior space being sealed and the panel assembly being molded to have a normal position that is intermediate the extended position and the withdrawn position so that the living hinges urge the panel assembly to the intermediate position and then air is selectively evacuated from the sealed interior space to withdraw the panel assembly to the withdrawn position or selectively supplied to the sealed interior space to extend the panel assembly.

16. The air dam of claim 11 further comprising the interior space is sealed and the sealed interior space of the panel assembly is connected to a valve that selects between a source of compressed air and a source of vacuum to respectively move the air dam assembly to the extended position or to the withdrawn position.

17. The air dam of claim 11 further comprising a network of smart metal alloy wires provided within the panel assembly and connected to the serially arranged pleats so that conducting electricity to the smart metal alloy wires will shorten the wires and move the panel assembly to the withdrawn position.

18. An air dam for attachment to an underside of a motor vehicle comprising:
a panel assembly including a top wall attached to the underside of the motor vehicle, forward and rearward walls depending from the top wall, and a bottom wall, said walls cooperating to define an interior space, and said forward and rearward walls each having a plurality of serially arranged pleats connected by living hinges by which the panel assembly can be varied in height by flexing the living hinges to provide an extended position of the panel assembly in which the bottom wall is positioned further below the underside of the motor vehicle and a withdrawn position in which the bottom wall is withdrawn upwardly closer to the underside of the motor vehicle,
and a network of smart metal alloy wires provided within the panel assembly and connected to the serially arranged pleats so that conducting electricity to the smart metal alloy wires will shorten the wires and move the panel assembly to the withdrawn position.

* * * * *